United States Patent
Houssain et al.

(10) Patent No.: US 9,565,017 B2
(45) Date of Patent: *Feb. 7, 2017

(54) METHOD FOR EFFICIENTLY PROTECTING ELLIPTIC CURVE CRYPTOGRAPHY AGAINST SIMPLE POWER ANALYSIS ATTACKS

(71) Applicant: Umm Al-Qura University, Makkah (SA)

(72) Inventors: Hilal Houssain, Jeddah (SA); Turki F. Al-Somani, Makkah (SA)

(73) Assignee: Umm Al-Qura University (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,945

(22) Filed: Nov. 10, 2014

(65) Prior Publication Data

US 2016/0134417 A1    May 12, 2016

(51) Int. Cl.
*H04K 1/00* (2006.01)
*H04L 9/00* (2006.01)
*H04L 9/30* (2006.01)

(52) U.S. Cl.
CPC .............. *H04L 9/003* (2013.01); *H04L 9/3066* (2013.01); *H04L 2209/34* (2013.01)

(58) Field of Classification Search
USPC ................ 380/30, 277, 28, 44–47, 259, 268
See application file for complete search history.

(56) References Cited

U.S. PATENT DOCUMENTS

| | | | |
|---|---|---|---|
| 7,215,780 B2 | 5/2007 | Lambert et al. | |
| 7,483,534 B2 | 1/2009 | Ibrahim | |
| 7,676,037 B2 | 3/2010 | Jung et al. | |
| 8,160,245 B2 * | 4/2012 | Ebeid | G06F 7/725 380/1 |
| 8,189,775 B2 * | 5/2012 | Ghouti | G06F 7/725 380/37 |
| 8,300,808 B2 | 10/2012 | Nogami et al. | |
| 8,345,864 B1 | 1/2013 | Robinson et al. | |
| 2004/0228485 A1 * | 11/2004 | Abu | H04L 9/3073 380/44 |
| 2008/0219437 A1 * | 9/2008 | Ebeid | G06F 7/725 380/30 |

(Continued)

OTHER PUBLICATIONS

Coron, Jean-Sebastien, "Resistance Against Differential Power Analysis for Elliptic Curve Cryptosystems," Cryptographic Hardware and Embedded Systems, 1999, pp. 292-302, vol. 1717, Springer-Verlag.

(Continued)

*Primary Examiner* — Amare F Tabor
(74) *Attorney, Agent, or Firm* — Hauptman Ham, LLP

(57) ABSTRACT

A method and device for protecting elliptic curve cryptography against simple power attacks is disclosed. The method is based on a processor such as a computer equipped to encrypt and decrypt communications and selecting and entering a point P on an elliptic curve in the computer. The processor provides k copies of the point P (kP). The processor is used to divide a string of Ks into two equal length partitions that are scanned from right to left and performing point doubling operation and delay the point addition operation by storing the some doubled points in a buffer for later performing of addition operation.

3 Claims, 1 Drawing Sheet

(56) References Cited

U.S. PATENT DOCUMENTS

| | | | | |
|---|---|---|---|---|
| 2009/0097637 A1* | 4/2009 | Boscher | .................. | G06F 7/723 380/28 |
| 2009/0180609 A1* | 7/2009 | Douguet | .................... | G06F 7/72 380/28 |
| 2010/0031055 A1* | 2/2010 | Furukawa | ............... | G06F 7/723 713/189 |
| 2010/0061547 A1* | 3/2010 | Langendorfer | ......... | G06F 7/724 380/28 |
| 2014/0064491 A1* | 3/2014 | Ghouti | .................. | H04L 9/3013 380/282 |

OTHER PUBLICATIONS

Elgamal, Taher, "A Public Key Cryptosystem and a Signature Scheme Based on Discrete Logarithms," IEEE Transactions on Information Theory, 1985, pp. 10-18, vol. IT-31, No. 4.

Gordon, Daniel M., "A survey of fast exponentiation methods," Journal of Algorithms, 1998, pp. 129-146.

Koblitz, Neal, "Elliptic Curve Cryptosystems," Mathematics of Computation, 1987, vol. 48, No. 177, pp. 203-209.

Kocher, Paul C., "Timing Attacks on Implementations of Diffie-Hellman, RSA, DSS, and Other Systems," CRYPTO 1996, LNCS 1109, pp. 104-113.

Kocher, Paul, "Differential Power Analysis," CRYPTO 1999, LNCS 1666, pp. 388-397.

Rivest, R.L, "A Method for Obtaining Digital Signatures and Public-Key Cryptosystems," Communications of the ACM, vol. 21, No. 2, pp. 120-126.

* cited by examiner

METHOD FOR EFFICIENTLY PROTECTING ELLIPTIC CURVE CRYPTOGRAPHY AGAINST SIMPLE POWER ANALYSIS ATTACKS

FIELD OF THE INVENTION

This invention relates to an efficient method for protecting Elliptic Curve Cryptography (ECC) against Simple Power Analysis attacks by changing the behavior of the ECC, more particularly that of the scalar multiplication method (the basic operation of ECC). For instance, the straightforward binary scalar multiplication method can be inspected by a computer to learn the bits values of a scalar multiplier k, and if the imputed bit $k_i=0$ only point doubling is performed, however, if the imputed bit $k_i=1$, both point doubling and point addition is used. The invented scalar multiplication method introduces confusion in an efficient manner.

BACKGROUND FOR THE INVENTION

Elliptic curve cryptography has been used for a number of years to provide security against access to confidential information, trade secrets and private communications. For example, two U.S Patents in the name of Mohammad K. Ibrahim, U.S. Pat. Nos. 7,483,533 and 7,483,534 are directed to Elliptic Polynomial Cryptography with Multi X- and Y-Coordinates respectively, embedding. Methods of cryptographic encryption and decryption use more than one quadratic variable that are termed X and Y coordinates. The additional "mx" coordinates and "my" coordinates are used to obtain an elliptic polynomial equation with multi x and y coordinates instead of one x coordinate and one y coordinate. The additional mx coordinates are used to embed extra message data bits.

Any ny-fold increase in the number of embedded message data bits in a single elliptic point can be achieved with the improved method. The reason is that the number of points that satisfy an elliptic polynomial equation defined over F(p) and which can be used in the corresponding cryptosystem is increased by a factor of $(\#F)^{mx}$ or $^{ny}$, where # denotes the size of the field. The use of additional x or y coordinates can then be used to reduce computational complexity. Alternatively, this can be used to increase security by making the bit positions where data bits are embedded known only to the sender and receiver. Also, it can be used as a countermeasure by randomizing the bit positions where data bits are embedded.

A recent U.S. Patent of Nogami et al., U.S. Pat. No. 8,300,808 is directed to an Arithmetic Operation Method and Arithmetic Operation Device. As disclosed, where there exists a plurality of different elements Y and each element Y is represented by tuples in which a plurality of different elements X are combined with an operator, an arithmetic operation method for calculating each element Y by using an electronic computer that associates each element Y with the element X by setting each element X, sets temporary data having an index indicating whether or not each element Y has an identical element X for each element X, and represents each element Y by the temporary data combined with the operator. When there is a combination of temporary data which is common in a plurality of elements Y in temporary data contained in each element Y, new temporary data is set by combining the common temporary data and each element Y consisting of each tuple is calculated using new temporary data.

A more recent U.S. Pat. No. 8,345,864 of Robinson et al. is entitled Elliptic Curve Cryptography Scalar Multiplication With On Demand Acceleration Table Generation. As disclosed, the invention involves dynamic generation of at least a portion of an acceleration table for use in elliptic curve cryptography. Such dynamic generation is capable of providing savings with regard to carrying out elliptic curve cryptography without an acceleration table. Furthermore, once the portion of the acceleration table is dynamically generated and stored in a high speed cache, the portion of the acceleration table is capable of being used on subsequent elliptic curve cryptography operations as well, thus enabling the cost of dynamically generating the acceleration table to be amortized across multiple elliptic curve cryptography operations.

The aforementioned patents are directed primarily to elliptic curve cryptography as opposed to providing security against side channel attacks or simple power analysis attacks. However, two of the literature references listed at the end of this specification are directed to "Timing Attacks on Implementation of Diffie-Hellman, RSA, DSS and Other Systems" by Paul C. Kocher and "Differential Power Analysis" by Paul Kocher, Jasem Jaffe and Benjamin Jun.

The first article points out that computers and microchips leak information about the operations they process and examines specific methods for analyzing power consumption measurements to reveal secret keys from tamper resistant devices. The article also discusses approaches for building crypto systems that can operate securely in existing hardware that leaks information.

The second of the aforementioned articles by Paul Kocher et al. examines specific methods for analyzing power consumption measurements to find secret keys from tamper resistant devices and approaches for building crypto systems that can operate securely in existing hardware that leaks information.

Notwithstanding the above, and because of the physical characteristics of all tamper resistant devices and their use in potentially hostile environments, it is presently believed that there is a need and a potential commercial market for methods and systems for securing elliptic curve cryptography against simple power attacks. The methods in accordance with the present invention are efficient, cost effective and processed using reduced computational time.

BRIEF SUMMARY OF THE INVENTION

In essence the present invention contemplates a method for securing elliptic curve cryptography against simple power analysis attacks comprises and/or consists of three main steps and three concurrent sub-steps. Using a computer, the first major step is to create three memory buffers ($B_1$, $B_2$, and $B_3$) of equal size for each bit pairs value of (01, 10, and 11). The second major step is to split the scalar string into two equal length partitions then the third major step is to simultaneously scan the two partitions from right to left, and then for each of the scanned bit pairs the following three concurrent sub-steps are pursued: 1) to perform a point doubling operation for all inspected bit pairs regardless of its value; 2) if at least one bit of the inspected bit pairs is equal to '1' to store the most recent value of point doubling operation in its allocated buffer in the computer as previously defined, where buffers B1, B2, and B3 are allocated for bit pairs of value (01), (10), and (11) respectively; and 3) to check if any of the buffers reaches its limits (i.e., full buffer) or the scan is completed, and then perform point addition operations for all available points in the full buffer.

As a result of the above, an attacker observing leaked traits will see a repeated series of point doubling followed by point addition leading to confusion. In addition, the scanning of the two partitions instead of the scalar as single string simultaneously increases efficiency of the inventive method.

DETAILED DESCRIPTION OF THE PREFERRED EMBODIMENT OF THE INVENTION

Figure 1:
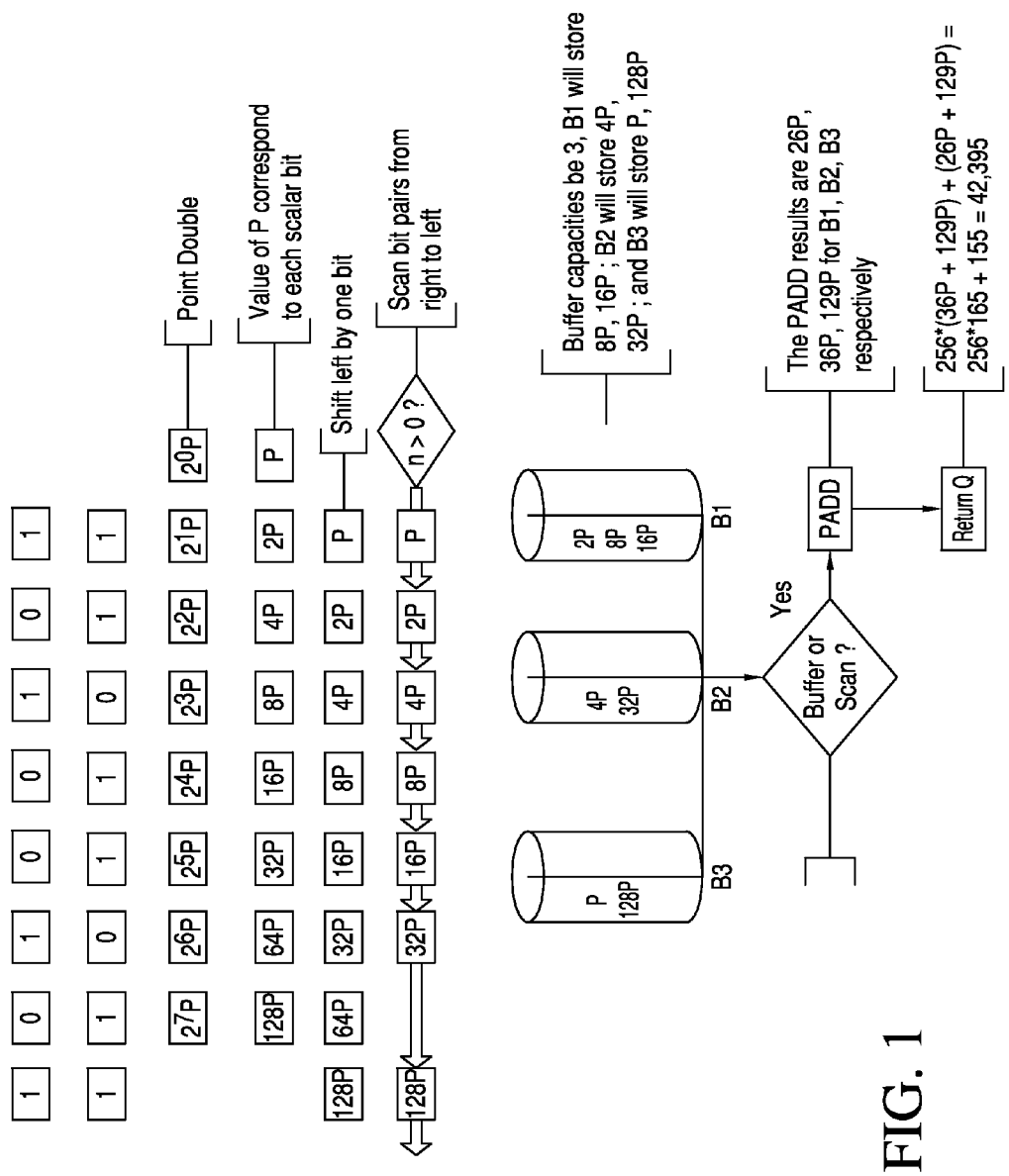
FIG. 1 illustrates a scalar multiplication method in accordance with the present invention wherein the scalar string length is 16 bits.

The ability to use smaller key sizes and the computationally more efficient ECC algorithms compared to those used in earlier public key cryptosystems such as RSA (Rivest et. al. 1978) and ElGamal (ElGamal, 1985) are two main reasons why elliptic curve cryptography is becoming more popular. Elliptic curve cryptograph is considered particularly suitable for implementation on smart cards or mobile devices. Because of the physical characteristics of such devices and their use in potentially hostile environments, Power Analysis Attacks (PAA) (Kocher, 1996; Kocher, et. al. 1999) on such devices is considered serious threats. Power analysis attacks seek to break the security of these devices through observing their power consumption trace or computations timing. Careless or naive implementations of cryptosystems may allow power analysis attacks to infer the secret key or obtain partial information about it. Thus, designers of such systems seek to introduce algorithms and designs that are not only efficient, but also power analysis attack resistant.

Scalar multiplication is the basic operation for elliptic curve cryptography. Scalar multiplication of a group of points on an elliptic curve is analogous to the exponentiation of a multiplicative group of integers modulo a fixed integer m. The scalar multiplication operation, denoted as kP, where k is an integer and P is a point on the elliptic curve, represents the addition of k copies of point P. Scalar multiplication is then computed by a series of point doubling and point addition operations of the point P that depends on the bit sequence that represents the scalar multiplier k.

Let $k=(k_{m-1}, \ldots, k_0)$, where $k_{m-1}$ is the most significant bit of k, be the binary representation of k. The multiplier k can be written as:

$$k = \sum_{0 \leq i < m} k_i 2^i = k_{m-1} 2^{m-1} + k_{m-2} 2^{m-2} + \cdots + k_1 2 + k_0 \quad (1)$$

The binary method algorithm is shown below:

---
Algorithm 1: Double-and- Add Method.
---
INPUT: k, P.
OUTPUT: kP.
1    Initialize Q[0] = O; Q[1] = P.
2    for i = 0 to m − 1
2.1  if ($k_i$ = 1) then Q[0] = ADD(Q[0], Q[1])
2.2  Q[1] = DBL(Q[1])
3    end for
4    return Q[0]

---

The binary scalar multiplication method is the most straightforward scalar multiplication method. It inspects the bits of the scalar multiplier k, if the inspected bit $k_i$=0, only point doubling is performed. If, however, the inspected bit $k_i$=1, both point doubling and point addition are performed. The binary method requires m point doublings and an average of m/2 point additions.

Power analysis attacks are usually divided into two types: Simple Power Analysis (SPA) attacks and Differential Power Analysis (DPA) attacks (Kocher, 1996), (Kocher, et. al. 1999). The present invention focuses on SPA attacks. SPA attacks consist of observing the power consumption during a single execution of a cryptographic algorithm. The power consumption analysis may also enable one to distinguish between point addition and point doubling. Coron (1999) suggested performing point addition and point doubling in each loop iteration where the result of the point addition operation may be either accepted or ignored based on the $k_i$ value (see Algorithm 2, known as the double-and-add-always algorithm).

---
Algorithm 2: Double-and- Add-Always Method.
---
INPUT: k, P.
OUTPUT: kP.
1    Initialize Q[0] = P, Q[1] = O, Q[2] = P .
2    for i = 0 to m − 1
2.1  Q[1] = Q[1+ $k_i$]
2.2  Q[0] = DBL(Q[0])
2.3  Q[2] = ADD(Q[0], Q[1])
3    end for
4    return Q[1]

---

The disadvantage of Algorithm 2 is the added dummy point additions. Algorithm 2 requires (m−1) point doubling and (m−1) point additions. This patent presents an efficient countermeasure against SPA attacks which requires no additional computation overhead.

Proposed Method

The basic idea of the proposed method is to secure scalar multiplication against simple power analysis attacks by using three main steps and three concurrent sub-steps. The first major step is to create three memory buffers ($B_1$, $B_2$, and $B_3$) of equal size. The second major step is to split the scalar string K into two equal length partitions, such that one partition $K_2=(k_2^{n/2} \ldots k_2^e \ldots k_2^1)_2$, and another partition $K_1=(k_1^{n/2} \ldots k_1^e \ldots k_1^1)_2$, then the third step is to simultaneously scan the two partitions from right to left, and then for each of the scanned bit pairs ($k_2^e, k_1^e$) for partitions $K_2$ and $K_1$, the following three concurrent sub-steps are pursued: 1) to perform a point doubling operation for all inspected bit pairs regardless of its value; 2) if at least one bit of the inspected bit pairs is equal to '1' to store the most recent value of point doubling operation in its allocated buffer in the computer. The buffer allocation is based on the bit pairs value ($k_2^e$, and $k_1^e$), i.e., $B_1$ for ($k_2^e$=0, and $k_1^e$=1), $B_2$ for ($k_2^e$=1, $k_1^e$=0), and $B_3$ for ($k_2^e$=1, and $k_1^e$=1). In this case, the point addition operation is delayed by interimly storing the points to be added in its allocated buffer; and 3) to check if any of the buffers reaches its limits (i.e., full buffer) or the scan is completed, and then perform point addition operations for all available points in the full buffer. The third sub-step will be repeated until the scan is completed, and the scalar multiplication value will be computed by using the accumulated points of the performed point addition operations results, and following the equation stated in steps 3 to 6 in algorithm 3. Using this proposed method for scalar multiplication, an attacker observing leaked power traces will see a repeated series of point doubling followed by point addition, which causes confusion to the attackers in learning the bit values of the scalar. The proposed method requires the least computation among the proposed methods in literature; including the non-secure Double-and-Add method for scalar multiplication, and thus it is feasible to be applied for the implementation of elliptic curve cryptography on resource constrained devices like sensor motes, RFID, and smartcards.

As illustrated in FIG. 1, the scalar string length is 16 bits. The scalar string K=(1010 0101 1001 1011)$_2$=42,395 and the buffer capacity is 3. Here the two sub-strings for the scalar K are K$_2$=(1010 0101)$_2$ and K$_1$=(1001 1011)$_2$ and n=2k$_2^e$+k$_1^e$, and n∈[0,3]. Points are stored in the corresponding buffers according to the value of n, i.e., in the buffers (B$_1$, B$_2$, B$_3$) for n=1, 2, 3 respectively. In the first iteration, e=0, k$_2^0$=1 and k$_2^1$=1, and n=3 (greater than 0), thus store the value of P (2$^e$*P=2$^0$*P=P) in the corresponding store, B$_3$, and move to the next iteration for e=1. As a result, the points stored in B$_1$ are (2P, 8P, 16P), B$_2$ are (4P, 32P), and in B$_3$ are (P, 128P). Since the buffer capacity is 3, and the scalar scanning is completed in the first iteration, the buffers are only filled once. Point addition operation is performed on the points in the buffers, and the result of the scalar multiplication is: 2$^8$*(36P+129P)+(26P+129P)=256*(165P)+(155P) =42,395P. The reference to 2$^0$ P in the third row is an indication of the point double operation for each scalar bit value. Further in a next row down P indicates the updated value corresponding to each scalar bit value. In addition, the P indicated in the next row down points to a shift left by one bit. Further, at the end of the next line the scanned bit pairs from right to left (MSB to LSB) and check for the value of n. If n is greater than 0, store the updated value of nP (result of the corresponding PDBL operation) in the corresponding buffer. Finally, the buffer capacities indicated at the end of the row is to let all buffer capacities be 3. B$_1$ will store the values to P, 8P, 16P, the B$_2$ will store 4P, 2P and the B$_3$ will store P, 128P. Still further, their point addition results for corresponding point doubling values relevant to scalar bit of 1 are of value 26P, 36P, 129P and stored in B$_1$, B$_2$, B$_3$ respectively.

The pseudo-code of the proposed scalar multiplication method is given in Algorithm 3.

Algorithm 3 Split Buffer-Based (SBB)
Scalar Multiplication Method

```
INPUT: P, K_2 = (k_2^{m/2} ... k_2^e ... k_2^1 )_2, K_1 = (k_1^{m/2} ... k_1^e ... k_1^1 )_2; r=4;
K = K_2||K_1 is a scalar, m is the scalar length.
OUTPUT: Q_1 = K*P
1        i_1 = i_2 = i_3 = 1
2        For e = 1 to m/2 do
2.1          n = 2k_2^e + k_1^e
2.2          If n > 0, then
2.2.1            B_n [i_n] = P
2.2.2            If i_n = r Then
2.2.2.1              For s = 1 to i_n do
2.2.2.1.1                Q_n = Q_n + B_n [s]
2.2.2.2              i_n = 1
2.2.3            Else
2.2.3.1              i_n = i_n + 1
2.3          P = 2*P
2.4          If e = m/2, Then
2.4.1            For n= 1 to 3 do
2.4.1.1              If i_n >1 Then
2.4.1.1.1                For s = 1 to i_n − 1 do
2.4.1.1.1.1                  Q_n = Q_n + B_n [s]
3        Q_2 = Q_2 + Q_3
4        For e = 1 to m/2 do
```

Algorithm 3 Split Buffer-Based (SBB)
Scalar Multiplication Method

```
4.1      Q_2 = 2*Q_2
5        Q_1 = Q_1 + Q_2
6        Return Q_1
```

Performance and Security Analysis

The proposed method requires m point doublings and on average (3m/8) point additions. This method outperforms the Double-and-Add method by reducing the point additions by m/8, and this is because point addition operation is not perform for the bit pairs (k$_2^e$,k$_1^e$)=(0,0), where its occurrence is with probability of ¼. This performance improves to m point doublings and an average of m/4 point additions when NAF (non-adjacent form) is used to represent the scalar multiplier. This assures a unique representation of an integer, and it has a main benefit that the number of 1's in the scalar string will be minimal. For regular binary representations, half of all bits will be 1's on average, but with NAF this drops to only one-third. The proposed method requires no extra dummy computations to secure scalar multiplication against simple power attacks.

The security of the proposed method depends on two levels of confusion: the first level is realized by inspecting two bits at a time instead of one single bit as the other methods. This increases possible values of the scalar bits from 0 or 1 to (00, 01, 10, 11), and thus complicate the guessing from simple 0 or 1, to pairs of 0's and 1's. The second level is achieved by delaying the point addition operation using buffers for interim point storage.

The depth of confusion of the invented method is directly related to the size of the buffer, i.e., if the buffer size is small, it will be full after a small number of processed 1's in the scalar string, and this reveal to the attackers using power analysis useful information about the processed scalar string portion, because of the ease guessing for short string. The larger the buffer size, the harder the guessing becomes.

While the invention has been described in connection with its preferred embodiment, it should be recognized that changes and modifications may be made therein without departing from the scope of the appended claims.

REFERENCES

Coron, J. 1999: 'Resistance against differential power analysis for elliptic curve cryptosystems'. In Cryptographic Hardware and Embedded Systems—CHES '99, LNCS 1717, Springer-Verlag, pp. 292-302.

ElGamal, T. 1985: 'A Public-Key Cryptosystem and a Signature Scheme Based on Discrete Logarithms'. Advances in Cryptology: Proceedings of CRYPTO 84, Springer Verlag, pp. 10-18.

Gordon, D.: 'A Survey of Fast Exponentiation Methods'. Journal of Algorithms, 1998, pp. 129-146.

Koblitz, N. 1987: 'Elliptic curve cryptosystems'. Mathematics of Computation, vol. 48, pp. 203-209.

Kocher, C. 1996: 'Timing Attacks on Implementations of Diffe-Hellman, RSA, DSS, and Other Systems'. CRYPTO '96, LNCS 1109, pp. 104-113.

Kocher, C., Jaffe, J. and Jun, B. 1999: 'Differential power analysis'. CRYPTO '99, LNCS 1666, pp. 388-397.

Rivest, R., Shamir, A. and L. Adleman. 1978: 'A method for obtaining digital signatures and public key cryptosystems'. Communications of the ACM, Vol. 21, No. 2, pp. 120-126.

What is claimed is:

1. A method for protecting a computer having a memory and a processor for elliptic curve cryptography against simple power attacks, said method comprising the steps of:
   a) selecting and entering a point P in the computer;
   b) dividing a string of ks into two equal length partitions;
   c) using the computer for scanning the partitions from right to left and performing a point doubling operation;
   d) delaying the point addition operation by interim storing in a relevant buffer on the computer;
   e) performing the point addition operation when the buffer is full or the scanning is complete; and
   f) whereby attackers observing leaked traits will see a repeated series of point doubling followed by point addition causing confusion; and
   in which steps c) to e) are repeated until the scan is complete; and in which the multiplier k is calculated using the following formula:

$$k = \sum_{0 \le i < m} k_i 2^i = k_{m-1} 2^{m-1} + k_{m-2} 2^{m-2} + \cdots + k_1 2 + k_0.$$

2. The method for protecting elliptic curve cryptography against simple power attacks according to claim 1, in which the method includes a step wherein the point addition operation is either accepted or ignored based on the k, value of the following algorithm:

```
INPUT: k, P.
OUTPUT: kP.
1    Initialize Q[0] = O; Q[1] = P.
2    for i = 0 to m − 1
2.1    if (k_i = 1) then Q[0] = ADD(Q[0], Q[1])
2.2    Q[1] = DBL(Q[1])
3    end for
4    return Q[0].
```

3. A method for protecting a computer having a memory and a processor for elliptic curve cryptography against simple power attacks, said method consisting of the following steps:
   a) selecting and entering a point P in the computer;
   b) multiplying point P by k using said computer to provide k copies of the point P (kP) and dividing a string of ks into two equal length partitions;
   c) using the computer for scanning the partitions from right to left, performing a scalar multiplication and performing a point doubling operation;
   d) delaying the point addition operation by interim storing in a relevant buffer on the computer;
   e) performing the point doubling operation when the buffer is full; and
   f) whereby attackers observing leaked traits will see a repeated series of point doubling followed by point addition causing confusion; and
   in which steps c) to e) are repeated until the scan is complete; and
   in which the multiplier k is calculated using the following formula:

$$k = \Sigma k_i 2^i = k_{m-1} 2^{m-1} + k_{m-2} 2^{m-2} + \ldots + k_1 2 + k_0.$$

$$0 <= i < m$$

* * * * *